United States Patent [19]

Sterling et al.

[11] 3,708,728
[45] Jan. 2, 1973

[54] ELECTROLYTIC CAPACITOR ELECTRODE COMPRISING SEMICONDUCTOR CORE WITH FILM-FORMING METAL COATING

[75] Inventors: Henley Frank Sterling, Ware; Eric Langley Bush, Matching Green, nr. Harlow, both of England

[73] Assignee: International Standard Electric Corporation, New York, N.Y.

[22] Filed: June 10, 1971

[21] Appl. No.: 151,903

[52] U.S. Cl. ................................. 317/230, 29/570
[51] Int. Cl. ........................................... H01g 9/04
[58] Field of Search .............. 317/230, 231, 232, 233

[56] References Cited

UNITED STATES PATENTS

| 2,299,228 | 10/1942 | Gray et al. | 317/230 |
| 3,256,468 | 6/1966 | Jenny et al. | 317/230 |
| 3,302,073 | 1/1967 | Broodo | 317/230 |
| 3,325,699 | 6/1967 | Hellicar | 317/230 |
| 3,430,108 | 2/1969 | Daendliker et al. | 317/230 |
| 3,330,999 | 7/1967 | Hellicar | 317/230 |

Primary Examiner—James D. Kallam
Attorney—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

This invention relates to an electrode for an electrolytic capacitor comprising a compacted porous semiconductor body of valve metal coated particles.

3 Claims, 1 Drawing Figure

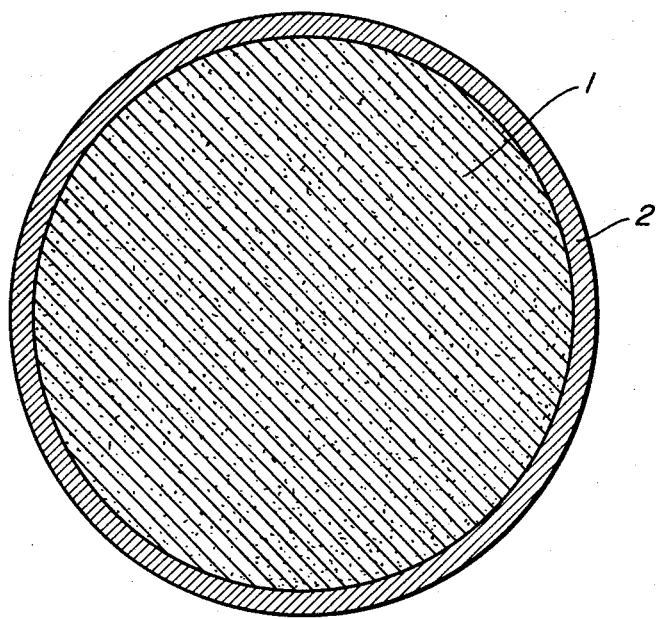

ELECTROLYTIC CAPACITOR ELECTRODE COMPRISING SEMICONDUCTOR CORE WITH FILM-FORMING METAL COATING

The invention relates to electrolytic capacitors, and particularly to the valve-metal electrode thereof.

In the manufacture of tantalum capacitor anodes from powdered tantalum it is known that a considerable part of the tantalum is used only as a contact and does not play an active part in the capacity forming mechanism. Since tantalum is a relatively rare and expensive metal it is reasonable to attempt to replace some, at least, of the 'contact' tantalum in the body of the anode with a less expensive material. These arguments also apply to niobium and niobium/tantalum alloys used as capacitor anodes.

It has already been proposed to use tantalum (or other valve metal) coated ceramic, i.e., electrically insulating, particles for the material of the anode. However, this results in a significant series resistance in the anode due to the presence of a relatively large quantity of the insulating cores of the particles.

According to the invention there is provided an electrode for an electrolytic capacitor comprising a compacted porous body of valve metal coated particles of electrically conducting material different from that of the coating.

The electrically conducting material of the particle core can be categorized under four types:

1. A metal or alloy, for example nickel or stainless steel, which is not a valve metal,
2. A metal or alloy, for example titanium for coating with tantalum, which is a different valve metal than that of the coating,
3. A non-metallic electrically conducting material, for example silicon carbide, and
4. An electrically conducting compound for example a lower oxide of titanium ($TiO_x$ where $x<2$) which if exposed through the valve metal coating can subsequently be converted to a non-conducting form.

The provision of the valve metal coating 2 on particle cores 1, shown in the FIGURE, of any of the above categories is carried out by any suitable means, such as vapor deposition from a volatile compound of the valve metal performed by means of a fluidized bed technique, by plasma deposition or by sputtering.

For cores of category 4, electrically conducting $TiO_x$ may be coated in a fluidized bed of such particles at an elevated temperature of 1,000°C using hydrogen. The combination of a reducing gas (hydrogen) and high temperature, results in the $TiO_x$ being maintained in its conducting lower oxide form during deposition of the coating.

Having produced the valve metal coated particles, the next stage in the manufacture of a capacitor anode is the production of the porus compacted anode body and the compaction techniques are to some extent determined by the particular category of the particle cores.

For category 1 and 3, e.g., a nickel or silicon carbide core, the body is formed by subjecting the coated powder to isostatic compaction, in a similar manner to that described in our copending Application Ser. No. 16398/70 (J. Lees - C.H.L. Goodman - C.S. Parfree 7-4-1), which may be, but not necessarily, followed by a heat treatment process to improve the electrical characteristics of the finished capacitor.

With category 1 metal cores, if the compaction and/or heat treatment process results in any significant exposure of the core material through the valve-metal coating, the body will be unsuitable for use as a capacitor anode. Some limitation is therefore placed on very thin coatings.

With category 3 non-metallic cores, there are the same disadvantages of category 1, but probably less so because these category 3 materials are less ductile.

For category 2 cores, there is again isostatic compaction, followed if necessary by a heat treatment process to improve the electrical characteristics of the finished capacitor.

With category 2 cores, if the compaction and/or heat treatment process results in any exposure of the core metal through the coating, this exposed metal is also a valve metal and so the body is suitable for further processing in the capacitor manufacturing stage providing that a compatible electrolyte is used during anodization.

Finally for category 4 cores, the compaction may be solely by isostatic pressing on the one hand or solely by sintering at a high temperature on the other, e.g. 1600°C for $TiO_x$ cores. These two method may be combined however and are not mutually exclusive.

As already indicated, if with category 4 cores there is exposure of core material through the valve metal coating, this exposed material can be converted to a non-conducting form. In the case of $TiO_x$ cores, the subsequent anodizing, which is carried out in any conventional manner, results in any exposed $TiO_x$ being converted to $TiO_2$ which is non-conducting and also plays an active role in the capacitor action.

The anodizing of the compacted porous bodies having valve metal coated particles with cores of categories 1, 2 or 3 is also carried out in any conventional manner and the required further steps for the production of an electrolytic capacitor from these anode bodies, i.e., provision of electrolyte, cathode, lead attachment, housing and/or encapsulation are carried out in known manner.

It is to be understood that the foregoing description of specific examples of this invention is made by way of example only and is not to be considered as a limitation on its scope.

We claim
1. An electrode for an electrolytic capacitor comprising a compacted porous body of valve metal coated silicon particles.
2. An electrode for an electrolytic capacitor comprising a compacted porous body of valve metal coated silicon carbide particles.
3. An electrode according to claim 1, wherein said valve metal is tantalum.

* * * * *